Apr. 3, 1923.
F. WEST
1,450,272
REPAIRMAN'S BRAKE ATTACHMENT FOR AIR BRAKES
Filed Sept. 22, 1919
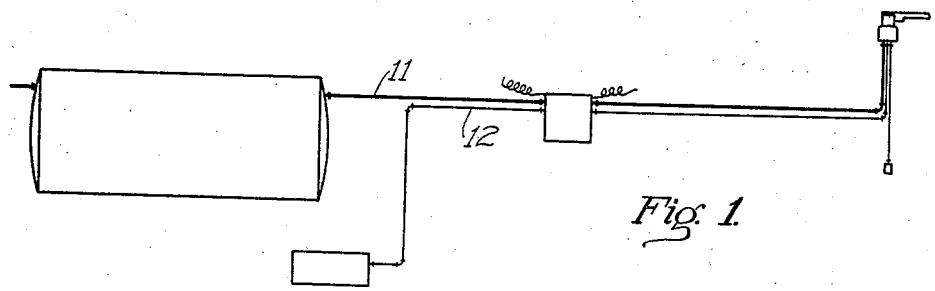
Fig. 1.
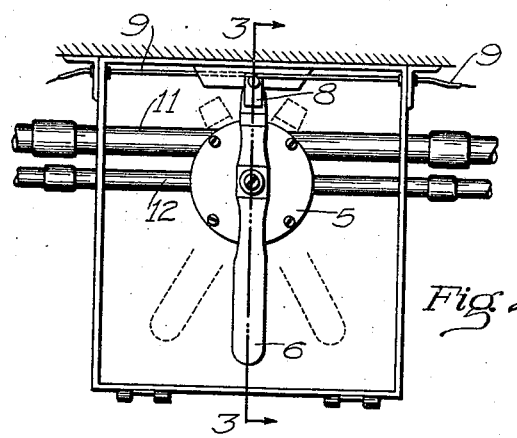
Fig. 2.
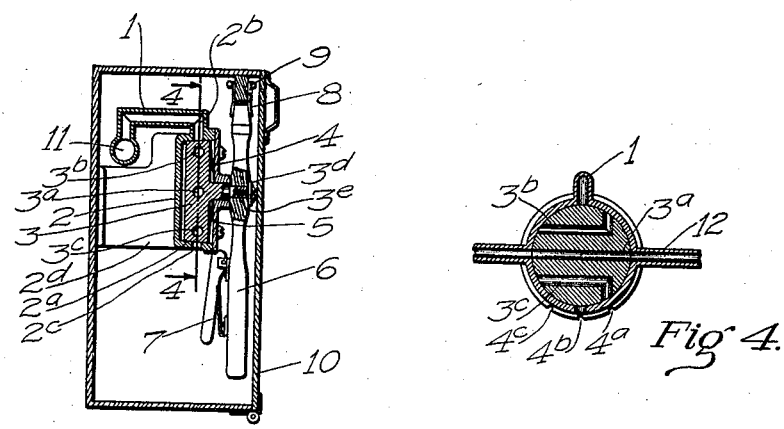
Fig. 3.
Fig. 4.
INVENTOR
FRANK WEST
BY A. B. Bowman
ATTORNEY Patented Apr. 3, 1923.

1,450,272

UNITED STATES PATENT OFFICE.

FRANK WEST, OF EAST SAN DIEGO, CALIFORNIA.

REPAIRMAN'S BRAKE ATTACHMENT FOR AIR BRAKES.

Application filed September 22, 1919. Serial No. 325,417.

*To all whom it may concern:*

Be it known that I, FRANK WEST, a citizen of the United States, residing at East San Diego, in the county of San Diego and State of California, have invented certain new and useful Improvements in Repairmen's Brake Attachments for Air Brakes, of which the following is a specification.

My invention relates to an attachment to be used in connection with air brakes for street cars, railway cars and the like and the objects of my invention are: first, to provide an attachment to be used in connection with the air brakes so that a repair man in fixing or adjusting the brake apparatus may use the air from the compressed air tanks for operating the brake system from beneath the car independent of the position of the control for operating the brakes; second, to provide an apparatus of this class which is so constructed that the car cannot be electrically operated unless this apparatus is in the proper or neutral position; third, to provide an apparatus of this class by the use of which the brakes may be readily applied or released by the movement of a lever which when in a vertical position is neutral and the brakes will be operated in the usual manner and fourth, to provide an apparatus of this class which is very simple and economical of construction, durable, easy to operate, easy to install, and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a diagrammatic view of a fragmentary portion of an air brake apparatus for street cars and showing my apparatus in position therein; Fig. 2 is a side elevational view of the apparatus showing the casing with the cover removed to facilitate the illustration; Fig. 3 is a sectional view through 3—3 of Fig. 2 and Fig. 4 is a sectional view through 4—4 of Fig. 3.

Similar characters of reference refer to similar parts and portions throughout the several views of the drawings.

The feed pipe 1, valve casing 2, revoluble valve member 3, spring 4, cap 5, lever 6, latch 7, switch 8, main conducting wires 9 and casing 10 constitute the principal parts and portions of my brake attachment for air brakes.

My attachment is connected to and receives its air from the conventional reservoir pipe 11 of the ordinary brake system which extends from the motorman's valve to the air reservoir and also connects with the straight air application and release pipe 12 of the conventional air brake apparatus which extends from the motorman's valve to the brake cylinder. Communicating with the reservoir pipe 11 is a pipe 1 which connects at its other end with a valve casing 2 which is an annular member provided with a beveled inner surface $2^a$ and with an inlet port $2^b$ in its upper side and with an outlet port $2^c$ in its lower side. This casing 2 is supported by means of a support $2^d$ against the side of the casing 10. This casing 10 is supported on the bottom of the car. Revolubly mounted in this casing 2 is a revoluble valve member 3 which is beveled to conform with the beveled surface $2^a$ of the casing 2. These beveled surfaces are adapted to provide for taking up the wear and always providing a close fit of the revoluble member 3 to the member 2. This valve member 3 is provided with three ports, $3^a$, $3^b$ and $3^c$ as shown best in Fig. 4 of the drawings. Extending from the one side of this member 3 is a lug member $3^d$ which is provided with a reduced portion $3^e$. Upon this reduced portion is secured the lever 6, the reduced portion $3^e$ being square. Mounted over the portion $3^d$ and against the face of the casing 2 is a cap 5 which is provided with a central hole adapted for the lug portion $3^d$. Mounted between the member 5 and the member 3 is a plate spring 4 which tends to hold the member 3 inwardly in the casing 2 thus forming a close joint between said members. Pivotally mounted on the extended end of the lever 6 is a latch member 7 which is adapted to engage the notches $4^a$, $4^b$ and $4^c$ in the cover member 5 and hold the lever member 6 in certain positions relatively to the casing 2 and cover 5. When the lever 6 is in a vertical position as shown best in Fig. 2 of the drawings the latch 7 engages the notch $4^b$ in which case the valve is closed so that no air can pass through the pipe 1 but forms a passage way in the straight air application and release pipe 12 which is a neutral position in the operation of this attachment. If the lever 6 is moved so that the latch 7 engages the notch 4ª then the air passes from the pipe 11 to the pipe 1 through the port 3ᵇ and out into the end of the pipe 12 which connects with the brake cylinder applying the brakes. If, however, the lever is turned in the opposite direction so that the latch 7 engages the notch 4ᶜ this port 3ᵇ is closed, the air then passes from the pipe 12 through the port 3ᶜ and out through the exhaust 2ᶜ releasing the brake. The upper end of the lever 6 is adapted to engage the switch member 8 closing the circuit in the main wire 9 when in a vertical position as shown best in Fig. 2 of the drawings, but when turned in either direction therefrom breaks the circuit in the main wire 9 so that the car cannot be electrically operated unless the handle 6 is in a vertical position as shown in Fig. 2 which is the proper position so that the car can be readily controlled by the operator by the use of the conventional control.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction there is provided a repair man's attachment for air brakes whereby the repair man applies the air or releases the same as he desires from beneath the car in a position in close proximity to his work and not requiring the aid of an extra man to operate the air brake mechanism while repairing or adjusting the brakes or brake mechanism. That the device must be in neutral position before the car may be operated electrically thus providing against danger of lack of control of the car by reason of the repair man's brake mechanism being inadvertently left out of the neutral position.

Having thus described my invention what I claim as new and desire to secure by Letters Patent, is:

1. An apparatus of the class described, including an air reservoir, a motorman's control valve, a pipe connecting said reservoir with said control valve, an air brake cylinder, a straight air application and release pipe connecting said motorman's control valve with said air brake cylinder, a valve positioned in said pipes between said motorman's control valve and said air reservoir and brake cylinder communicating with the reservoir pipe and ported so as to communicate with the brake cylinder pipe through the straight air application and release pipe when in certain position and for exhausting the air when in another position.

2. An apparatus of the class described, including an air reservoir, a motorman's control valve, a pipe connecting said reservoir with said control valve, an air brake cylinder, a straight air application and release pipe connecting said motorman's control valve with said air brake cylinder, a valve positioned in said pipes between said motorman's control valve and said air reservoir and brake cylinder communicating with the reservoir pipe ported so as to communicate with the brake cylinder pipe through the straight air application and release pipe when in certain position and for exhausting the air when in another position and ported for a continuation of the straight air application and release pipe when in another position.

3. In an apparatus of the class described, the combination with the reservoir pipe and straight air application and release pipe of an air brake, of a valve communicating with the reservoir pipe ported so as to communicate with the brake cylinder through the straight air application and release pipe when in certain position and for exhausting the air when in another position and ported for a continuation of the straight air application and release pipe when in another position, an electrical switch in connection with the main line wiring for breaking the circuit in said wiring when the continuity of the straight air application and release pipe line is broken.

4. An apparatus of the class described, including an air reservoir, a motorman's control valve, a pipe connecting said reservoir with said control valve, an air brake cylinder, a straight air application and release pipe connecting said motorman's control valve with said air brake cylinder, a valve communicating with the reservoir pipe and ported so as to communicate with the brake cylinder pipe through the straight air application and release pipe when in certain position and for exhausting the air when in another position and an electrical switch in connection with the main line wiring for breaking the circuit in said wiring when the valve is so positioned as to communicate with the brake cylinder pipe.

In testimony whereof, I have hereunto set my hand at San Diego, California, this 13th day of September, 1919.

FRANK WEST.